United States Patent
Nakanishi

(10) Patent No.: US 7,463,185 B2
(45) Date of Patent: Dec. 9, 2008

(54) RADAR APPARATUS HAVING WIDE-ANGLE DETECTION

(75) Inventor: Motoi Nakanishi, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 11/946,657

(22) Filed: Nov. 28, 2007

(65) Prior Publication Data

US 2008/0088497 A1   Apr. 17, 2008

Related U.S. Application Data

(63) Continuation of application No. PCT/JP2006/311829, filed on Jun. 13, 2006.

(30) Foreign Application Priority Data

Jun. 15, 2005   (JP) ............................. 2005-174851

(51) Int. Cl.
  *G01S 13/00*  (2006.01)
(52) U.S. Cl. .............................. 342/70; 342/73; 342/158
(58) Field of Classification Search .................. 342/70, 342/73, 158
  See application file for complete search history.

(56) References Cited

U.S. PATENT DOCUMENTS 5,579,010 A * 11/1996 Iihoshi et al. .................. 342/70
7,132,976 B2 * 11/2006 Shinoda et al. ............... 342/70
2006/0158369 A1 * 7/2006 Shinoda et al. ............... 342/70

FOREIGN PATENT DOCUMENTS

| JP | 6-160518 | 6/1994 |
|----|----------|--------|
| JP | 6-242230 | 9/1994 |
| JP | 7-270602 | 10/1995 |
| JP | 8-334557 | 12/1996 |
| JP | 11-064500 | 3/1999 |
| JP | 2000-174548 | 6/2000 |
| JP | 2002-040139 | 2/2002 |
| JP | 2005-337759 | 12/2005 |
| WO | WO 2006134911 A1 * | 12/2006 |

* cited by examiner

*Primary Examiner*—Dan Pihulic
(74) *Attorney, Agent, or Firm*—Dickstein Shapiro LLP

(57) ABSTRACT

A radar apparatus wherein transmission beams are set such that reception intensities corresponding to the transmission beams are gradually reduced from a center direction toward an edge direction of a scanning-angle range. For example, when a vehicle serving as a target is located in the center direction of a transmission beam, the reception-signal intensity corresponding to an adjacent transmission beam is set higher than the reception intensity in the center direction corresponding to the transmission beam. When the scanning-angle distributions of reception-signal intensities corresponding to transmission beams are detected, a scanning angle exhibiting a peak reception-signal intensity is nearer the center of the scanning-angle range than the azimuth angle at which the target is actually located. Thus, a peak reception-signal intensity corresponding to a target located in a region that is a predetermined amount outside the scanning-angle range of a transmission beam appears inside the scanning-angle range.

9 Claims, 12 Drawing Sheets

US 7,463,185 B2

RADAR APPARATUS HAVING WIDE-ANGLE DETECTION

CROSS REFERENCE TO RELATED APPLICATIONS

The present application is a continuation of International Application No. PCT/JP2006/311829, filed Jun. 13, 2006, which claims priority to Japanese Patent Application No. JP2005-174851, filed Jun. 15, 2005, the entire contents of each of these applications being incorporated herein by reference in their entirety.

FIELD OF THE INVENTION

The present invention relates to in-vehicle radar apparatuses using millimeter waves, and more particularly, to a radar apparatus that performs scanning of a beam direction within a predetermined angle range and that detects a target in accordance with a reception signal.

BACKGROUND OF THE INVENTION

Various in-vehicle radar apparatuses using millimeter waves have been designed. Some radar apparatuses are angle-scanning radar apparatuses that transmit a transmission beam while performing antenna scanning within a predetermined scanning-angle range and that detect a target in accordance with a reception signal reflected by the target.

In such an angle-scanning radar apparatus, however, the transmission range of a transmission beam has a fan shape. Thus, as the distance from a vehicle in which the angle-scanning radar apparatus is provided increases, a detection range increases. In contrast, as the distance from the vehicle decreases, the detection range decreases.

In order to solve the above-mentioned problem, an angle-scanning radar apparatus is disclosed in Patent Document 1. The angle-scanning radar apparatus includes a plurality of antennas having slightly different directivity directions so that setting for long distance or short distance can be performed by changing the combination of antennas to be used for transmission and reception. More specifically, the radar apparatus improves the azimuth resolution for long distance by reducing the transmission-beam width using a plurality of antennas that are adjacent to each other and increases the detection range for short distance by increasing the transmission-beam width using antennas whose number is less than the number of antennas to be used for the long-distance detection.

Patent Document 1: Japanese Unexamined Patent Application Publication No. 8-334557

However, known general angle-scanning radar apparatuses are not capable of detecting a target located outside a scanning-angle range. For example, it is difficult to discriminate whether the peak of a reception signal detected at the outermost angle (an edge of the scanning-angle range) corresponds to a target located in the direction of that angle or corresponds to a target located outside the range.

In addition, the radar apparatus described in Patent Document 1 requires the use of a plurality of antennas. In the case of controlling transmission beams using the plurality of antennas, the radar apparatus requires a control switch group and requires the execution of complicated control processing for controlling the switch group. Furthermore, since different antennas are to be used for long-distance detection and short-distance detection, different types of operation control are necessary for the long-distance detection and the short-distance detection.

SUMMARY OF THE INVENTION

Accordingly, an object of the present invention is to provide a radar apparatus that achieves long-distance detection and wide-angle short-distance detection using a single antenna.

A radar apparatus according to the present invention includes transmission-beam forming means for forming a transmission beam to be transmitted from an antenna to the outside, beam scanning means for performing scanning of the transmission beam within a predetermined scanning-angle range, and reception detecting means for detecting a target in accordance with a reception signal that is obtained when the transmission beam is reflected by the target and that is received by the antenna. With respect to a target located at an azimuth angle of X degrees toward at least one edge of the scanning-angle range from a predetermined azimuth angle in the scanning-angle range, a reception-signal intensity for a transmission beam transmitted at the azimuth angle of X degrees is set lower than a reception-signal intensity for at least one transmission beam at an azimuth angle that is nearer the predetermined azimuth angle than the azimuth angle of X degrees.

With this configuration, setting is performed for each scanning angle such that, with respect to a target located in the direction of a scanning angle (azimuth angle) of X degrees, the intensity of a reception signal corresponding to a transmission beam in the direction of at least one scanning angle that is nearer a predetermined azimuth angle than the scanning angle of X degrees is higher than the intensity of a reception signal corresponding to a transmission beam in the direction of the scanning angle of X degrees. Thus, a scanning angle exhibiting a peak reception-signal intensity is nearer the predetermined azimuth angle than the scanning angle (azimuth angle) of the target.

In addition, in the radar apparatus according to this embodiment, the reception-signal intensity for the transmission beam transmitted at the azimuth angle of X degrees may be set lower than a reception-signal intensity for a transmission beam that is adjacent to the transmission beam transmitted at the azimuth angle of X degrees and that is at an azimuth angle nearer the predetermined azimuth angle than the azimuth angle of X degrees.

With this configuration, setting is performed for each scanning angle such that, with respect to a target located in the direction of a scanning angle (azimuth angle) of X degrees, the intensity of a reception signal corresponding to a transmission beam that is adjacent to the transmission beam in the direction of the scanning angle of X degrees and that is in the direction of a scanning angle nearer the predetermined azimuth angle than the scanning angle of X degrees is higher than the intensity of the reception signal corresponding to the transmission beam in the direction of the scanning angle of X degrees. Thus, a peak reception-signal intensity appears at an azimuth angle that is adjacent to the scanning angle (azimuth angle) of the target and that is nearer the predetermined azimuth angle than the scanning angle (azimuth angle) of the target.

In addition, in the radar apparatus according to the present invention, the transmission-beam forming means may perform setting such that, relative to an antenna gain in the predetermined direction in the scanning-angle range, antenna gains in scanning-angle directions are gradually reduced toward the one edge of the scanning-angle range.

With this configuration, when a target is located in a scanning-angle direction, a reception signal corresponding to a transmission beam transmitted in a scanning-angle direction nearer the predetermined direction than the scanning-angle direction in which the target is located is greater than a reception signal corresponding to a transmission beam transmitted in the scanning-angle direction at which the target is located.

In addition, in the radar apparatus according to the present invention, the transmission-beam forming means may gradually increase the widths of transmission beams in scanning-angle directions from the predetermined direction in the scanning-angle range toward the one edge of the scanning-angle range.

With this configuration, a distribution of beam-direction intensities of transmission waves can be achieved only with characteristics of an antenna without requiring a reduction of the intensities of transmission beams toward the one edge direction. Furthermore, as the distance to the one edge decreases, a reception signal can be obtained from a wider range. Thus, a scanning angle exhibiting a peak of a reception signal appears at a scanning angle nearer the predetermined direction than the scanning angle (azimuth angle) of the target.

In addition, in the radar apparatus according to the present invention, the reception detecting means may correct reception-signal intensities in scanning-angle directions such that, relative to a reception-signal intensity in the predetermined direction in the scanning-angle range, the reception-signal intensities are gradually reduced toward the one edge of the scanning-angle range.

With this configuration, instead of controlling a transmission beam as in each of the above-described configurations, a reception signal is controlled. Thus, results similar to those obtained in the above-described case where a transmission beam is controlled can be achieved. The control of a reception signal can be performed together with the control of a transmission beam. When control of a reception signal and control of a transmission beam are performed, considerable differences can be observed in individual scanning-angle directions.

In addition, the radar apparatus according to the present invention may further include storing means for storing a correspondence table or a relational expression between an azimuth angle of the target and a corresponding reception-signal intensity. The reception detecting means may detect the azimuth angle of the target by detecting a scanning angle exhibiting the maximum reception-signal intensity and applying the detected scanning angle to the correspondence table or the relational expression.

With this configuration, since a scanning angle exhibiting the maximum (peak) reception-signal intensity and the azimuth angle of the target in that case are associated with each other in advance, the azimuth angle of the target can be detected by detecting the peak reception-signal intensity in accordance with the obtained scanning-angle distribution of reception-signal intensities.

In addition, in the radar apparatus according to the present invention, the reception detecting means may perform interpolation of reception-signal intensities corresponding to transmission beams and detect the maximum reception-signal intensity.

With this configuration, interpolation of reception signals in scanning-angle directions appearing discretely in accordance with a scanning-angle resolution (for example, replacement by a predetermined continuous function) is performed, and a peak is detected. Thus, the position of the peak can be obtained more accurately.

According to the present invention, a peak reception-signal intensity appears at an angle nearer the center of a scanning-angle range than a scanning angle (azimuth angle) at which a target is actually located. Thus, at and in the vicinity of an edge of the scanning-angle range, a peak reception-signal corresponding to a target that is located outside the scanning-angle range appears in the scanning-angle range. Accordingly, a target located outside the scanning-angle range in which a transmission beam is actually transmitted can be detected.

In addition, according to the present invention, the shorter the distance to an edge of the scanning-angle range is, the greater the width of a transmission beam is. Thus, a target that is located more distant from the edge of the scanning-angle range in the outward direction can be detected.

In addition, according to the present invention, when control of a reception-signal intensity is performed, at and in the vicinity of an edge of the scanning-angle range, a peak reception-signal corresponding to a target that is located outside the scanning-angle range appears in the scanning-angle range. Accordingly, a target located outside the scanning-angle range in which a transmission beam is actually transmitted can be detected.

In addition, according to the present invention, when a scanning angle of a target and a corresponding scanning angle exhibiting a peak reception-signal intensity are associated with each other, irrespective of whether the angle is inside or outside the scanning-angle range, the scanning angle, that is, the azimuth, of the target can be easily detected in accordance with the peak reception-signal intensity.

In addition, according to the present invention, since interpolation of reception-signal intensities of scanning angles is performed, the continuity of reception-signal intensities appearing discretely can be achieved. Thus, a scanning-angle distribution of dense reception-signal intensities can be achieved. When a peak is detected in accordance with such a scanning-angle distribution of dense reception-signal intensities, the azimuth of the target can be detected more accurately.

Figure 1:
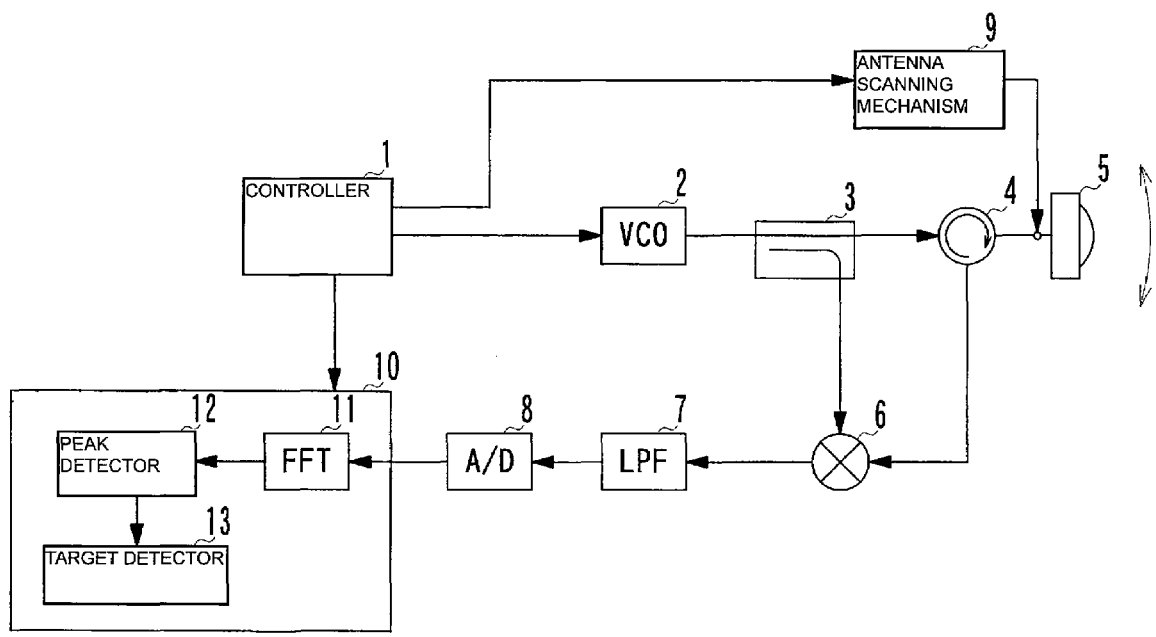
FIG. 1 is a schematic block diagram showing the configuration of a radar apparatus according to a first embodiment.

REFERENCE NUMERALS 1 controller
2 VCO
3 coupler
4 circulator
5 antenna
6 mixer
7 LPF
8 A/D converter
9 antenna scanning mechanism
10 data processing unit
11 FFT processor
12 peak detector
13 target detector
14 data corrector
15 VGA

DETAILED DESCRIPTION OF THE INVENTION

A radar apparatus according to a first embodiment of the present invention will be described with reference to FIGS. 1 to 8. In this embodiment, as an example of a radar apparatus, an FM-CW radar apparatus installed in a vehicle will be described.

FIG. 1 is a schematic block diagram showing the configuration of the radar apparatus according to this embodiment.

The radar apparatus according to this embodiment includes a controller 1, a VCO 2, a coupler 3, a circulator 4, an antenna 5, a mixer 6, a low-pass filter (LPF) 7, an A/D converter 8, an antenna scanning mechanism 9, and a data processing unit 10. The data processing unit 10 includes an FFT processor 11, a peak detector 12, and a target detector 13.

The controller 1 sequentially generates digital data of a modulation signal for modulating a transmission signal, and outputs a control voltage corresponding to the digital data to the VCO 2. The VCO 2 changes an oscillation frequency in accordance with the control voltage received from the controller 1. Thus, for example, the oscillation frequency of the VCO 2 is continuously FM-modulated in a triangular wave shape. The coupler 3 transmits the FM-modulated transmission signal to the circulator 4 and supplies part of the transmission signal at a predetermined distribution ratio as a local signal to the mixer 6. The circulator 4 transmits the transmission signal to the antenna 5 and supplies to the mixer 6 a reception signal received from the antenna 5. The antenna 5 transmits a continuous-wave transmission signal that has been FM-modulated by the VCO 2 as a transmission beam having a predetermined width. In addition, the antenna 5 periodically changes the direction of the transmission beam using the antenna scanning mechanism 9 over a predetermined scanning-angle range and performs scanning of the transmission beam. Hereinafter, an example in which beam scanning is performed along a horizontal direction from the vehicle in which the radar apparatus is installed will be described. The scanning angle corresponds to an azimuth angle. The angular pitch at the center of the radiation direction of a transmission beam, that is, the scanning-angle resolution, is set in advance. In addition, the distributions of transmission-beam intensities for scanning angles are set in advance.

Figure 2:
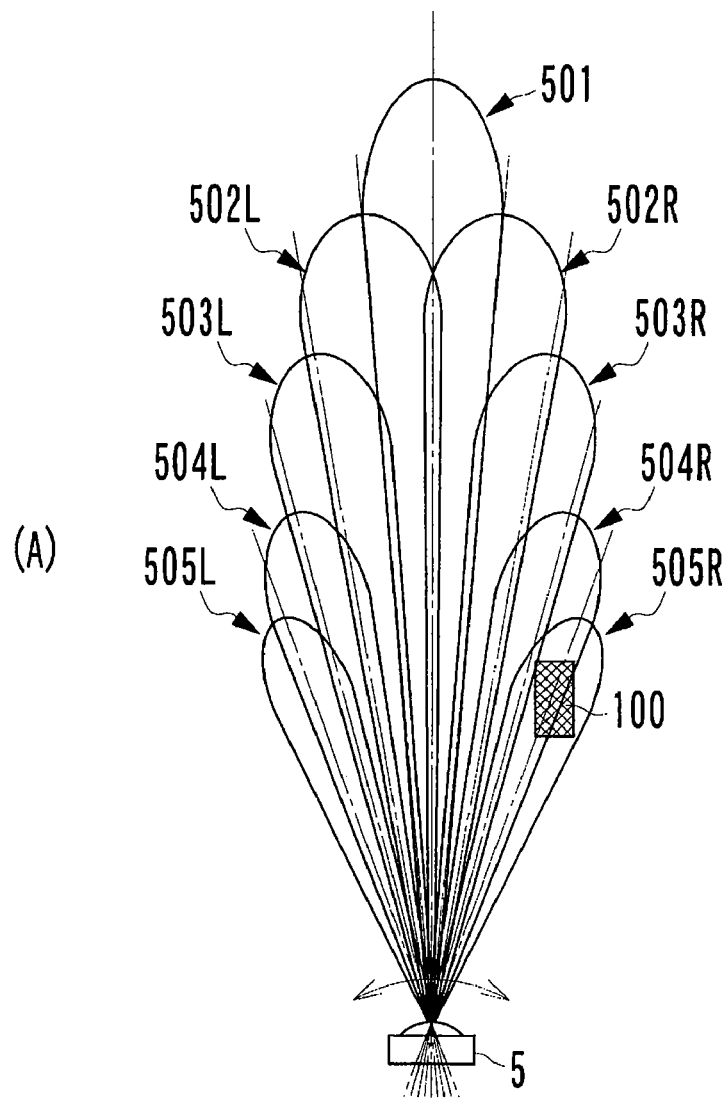
FIG. 2 schematically shows distributions of intensities of reception signals corresponding to transmission beams in scanning-angle directions.
Figure 2:
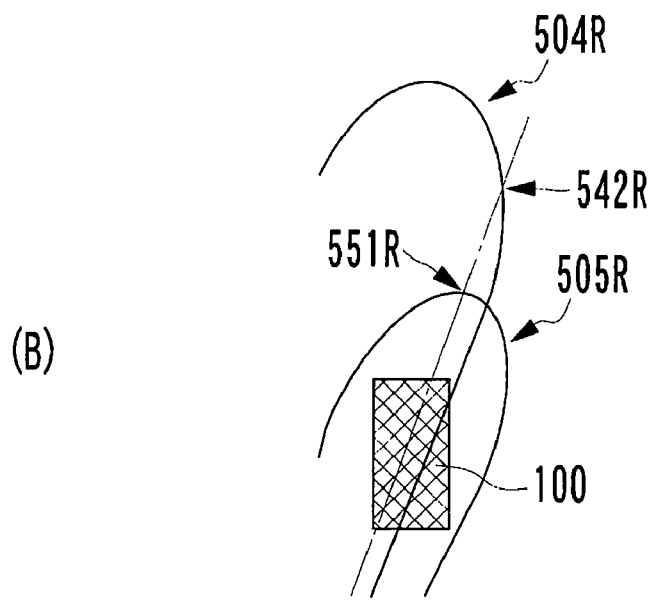

FIG. 2 schematically shows distributions of intensities of reception signals corresponding to transmission beams in scanning-angle directions. FIG. 2(A) is an overall view, and FIG. 2(B) is a partially enlarged view. In FIG. 2, reference numerals 501, 502R to 505R, and 502L to 505L represent shapes of transmission beams and shapes of distributions of intensities of reception signals corresponding to the transmission beams. As the intensity of a reception signal corresponding to a transmission beam, the intensity of a reception signal obtained when a transmission beam is transmitted to a target located in the same distance from the vehicle in each azimuth direction (scanning-angle direction) is represented.

Figure 3:
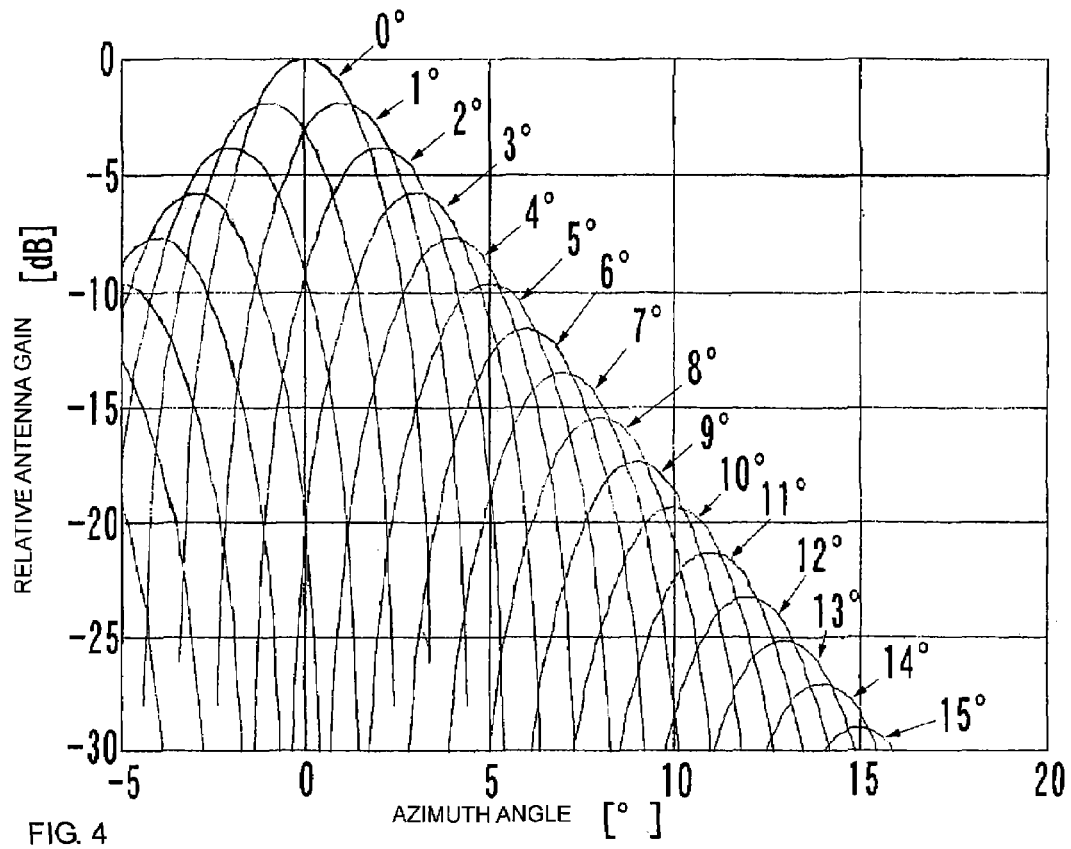
FIG. 3 is an antenna-gain pattern diagram showing the relationship between an azimuth angle (scanning angle) and a relative antenna gain.

FIG. 3 is an antenna-gain pattern diagram showing the relationship between an azimuth angle (scanning angle) and a relative antenna gain. The azimuth angle represents an angle formed with respect to the 0-degree direction, which is the center direction of the scanning-angle range of the antenna 5. An angle on the right-hand side when viewed from the vehicle toward the radiation direction represents a plus angle. An angle on the left-hand side when viewed from the vehicle toward the radiation direction represents a minus angle.

Transmission beams are set such that the intensity of a reception signal corresponding to a transmission beam in the center direction of the scanning-angle range is higher than the intensity of a reception signal corresponding to a transmission beam in a different scanning-angle direction. The intensities of reception signals corresponding to transmission signals are gradually reduced from the center direction toward an edge direction of the scanning-angle range. For example, as shown in FIG. 2, in the right-side region when viewed toward the radiation direction, relative to the reception intensity 501 of a transmission beam in the center direction, the reception intensities in scanning-angle directions are gradually reduced in the order of the reception intensities 502R, 503R, 504R, and 505R from the center direction toward an edge direction. In the left-side region when viewed toward the radiation direction, relative to the reception intensity 501 of the transmission beam in the center direction, the reception intensities in scanning-angle directions are gradually reduced in the order of the reception intensities 502L, 503L, 504L, and 505L from the center direction toward an edge direction.

Transmission beams that are adjacent to each other will be considered. For example, in a case where a target is located in an X-degree direction and the scanning-angle pitch is y degrees, the reception-signal intensity in the X-degree direction corresponding to a transmission beam transmitted in an X-y-degree direction, which is adjacent to a transmission beam transmitted in the X-degree direction and nearer the center than the transmission beam transmitted in the X-degree direction, is set higher than the reception-signal intensity in the X-degree direction corresponding to the transmission beam transmitted in the X-degree direction. For example, as shown in FIG. 2, in a case where a vehicle 100 serving as a target is located in the center direction of the transmission beam 505R, a reception-signal intensity 542R in the center direction of the transmission beam 505R corresponding to the transmission beam 504R is set higher than the reception intensity 551R in the center direction of the transmission beam 505R corresponding to the transmission beam 505R.

FIG. 3 specifically shows this setting. In the case shown in FIG. 3, the scanning-angle resolution is 1 degree. In the setting shown in FIG. 3, with respect to a target located in the +1-degree direction, the intensity of a reception signal corresponding to a transmission beam centered in the 0-degree direction is set higher than the intensity of a reception signal corresponding to a transmission beam centered in the +1-degree direction. Such a relationship (distribution) is set in the same manner when the scanning angle increases from the center (0-degree direction) of the scanning-angle range to the +15-degree direction, which is an edge of the scanning-angle range. With respect to a target located in the +15-degree direction, which is one edge of the scanning-angle range, the intensity of a reception signal corresponding to a transmission signal centered in the +14-degree direction is set higher than the intensity of a reception signal corresponding to a transmission beam centered in the +15-degree direction. Although distributions for scanning angles in a plus-angle direction (right-hand direction) are shown in FIG. 3, similar distributions can be provided for scanning angles in a minus-angle direction (left-hand direction). The distributions in the plus-angle direction may not be completely the same as the distributions in the minus-angle direction. Moreover, distributions in only one direction (plus-angle direction or minus-angle direction) may be provided.

Figure 4:
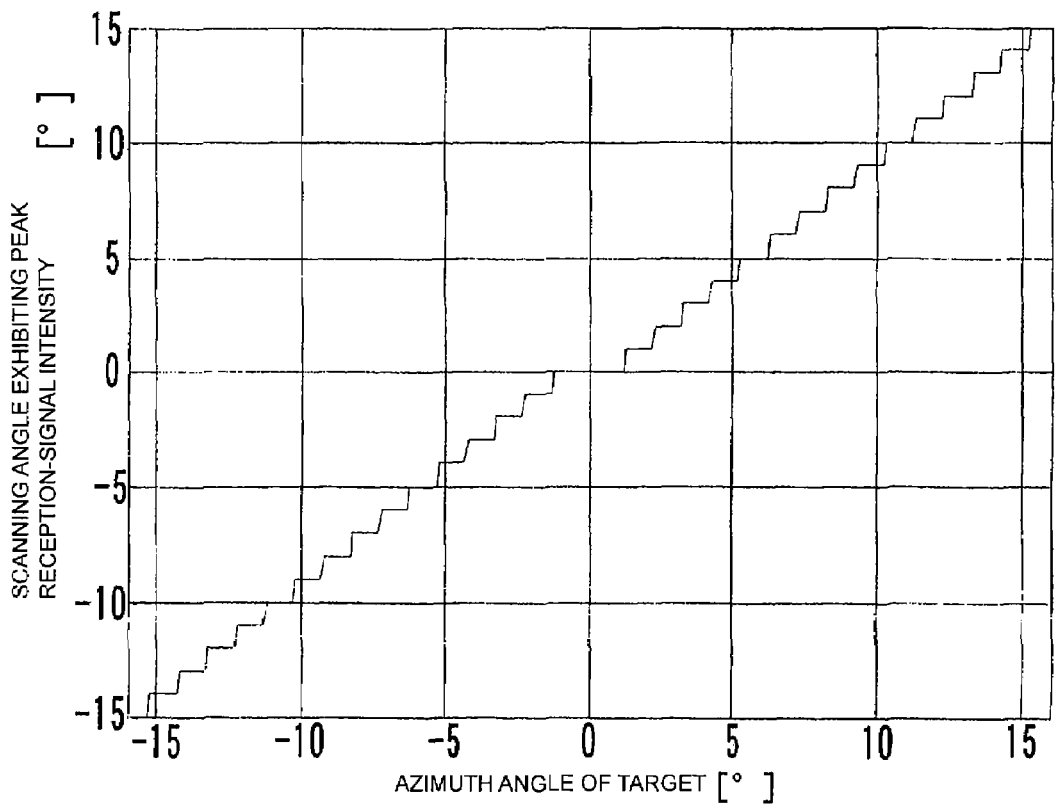
FIG. 4 shows the relationship between an azimuth angle exhibiting a peak reception-signal intensity and the azimuth angle of a target in a case where transmission beams are distributed as shown in FIG. 3.

With such a setting, the relationship between a scanning angle exhibiting a peak reception-signal intensity and the azimuth angle of a target, as shown in FIG. 4, can be obtained.

FIG. 4 shows the relationship between a scanning angle exhibiting a peak reception-signal intensity and the azimuth angle of a target.

As shown in FIG. 4, a scanning angle exhibiting a peak reception-signal intensity is shifted by 1 degree from the azimuth angle of the target, except for the center direction (0-degree direction), toward the center direction (0-degree direction).

A transmission beam set as described above is reflected by the target, and is received by the antenna 5 as a reflected signal from that direction. The antenna 5 outputs the reception signal to the circulator 4, and the circulator 4 transmits the reception signal to the mixer 6.

The mixer 6 mixes a local signal received from the coupler 3 with the reception signal received from the circulator 4, and outputs an IF beat signal. The LPF 7 eliminates an unwanted high-frequency component from the IF beat signal. The A/D converter 8 converts the signal into a sampling data sequence, and supplies the sampling data sequence to the FFT processor 11 of the data processing unit 10.

The FFT processor 11 performs FFT processing on the sampling data sequence that has been converted by the A/D converter 8, and supplies the FFT-processed sampling data sequence to the peak detector 12. The peak detector 12 detects a reception-signal intensity in each scanning-angle direction by performing threshold processing on the FFT-processed data, and supplies the detected reception-signal intensity to the target detector 13. The target detector 13 detects the azimuth angle of the target in accordance with the distribution of reception-signal intensities in scanning-angle directions using the method described below. In this case, the target detector 13 detects the relative distance and the relative speed from the vehicle to the target using an existing FM-CW method.

Figure 5:
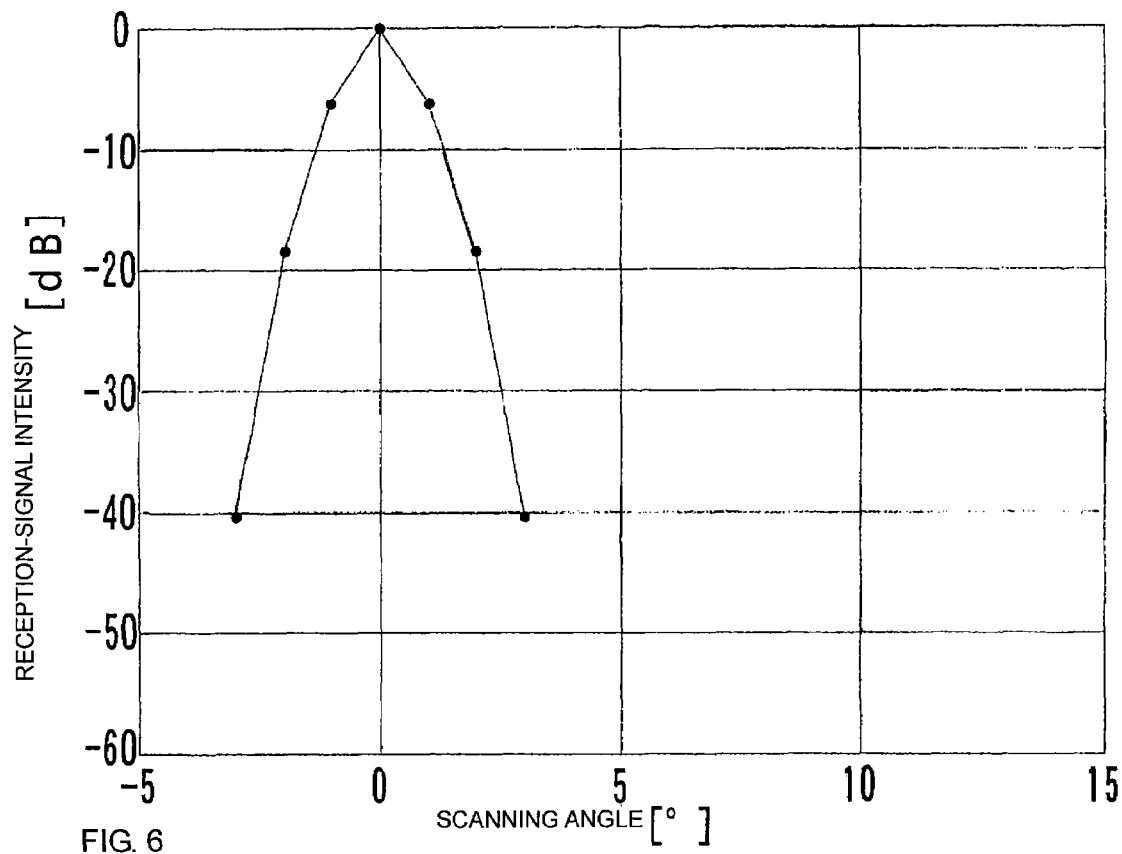
FIG. 5 shows the relationship between the azimuth angle of a transmission beam and a corresponding reception-signal intensity in a case where a target is located in a 0-degree direction.
Figure 6:
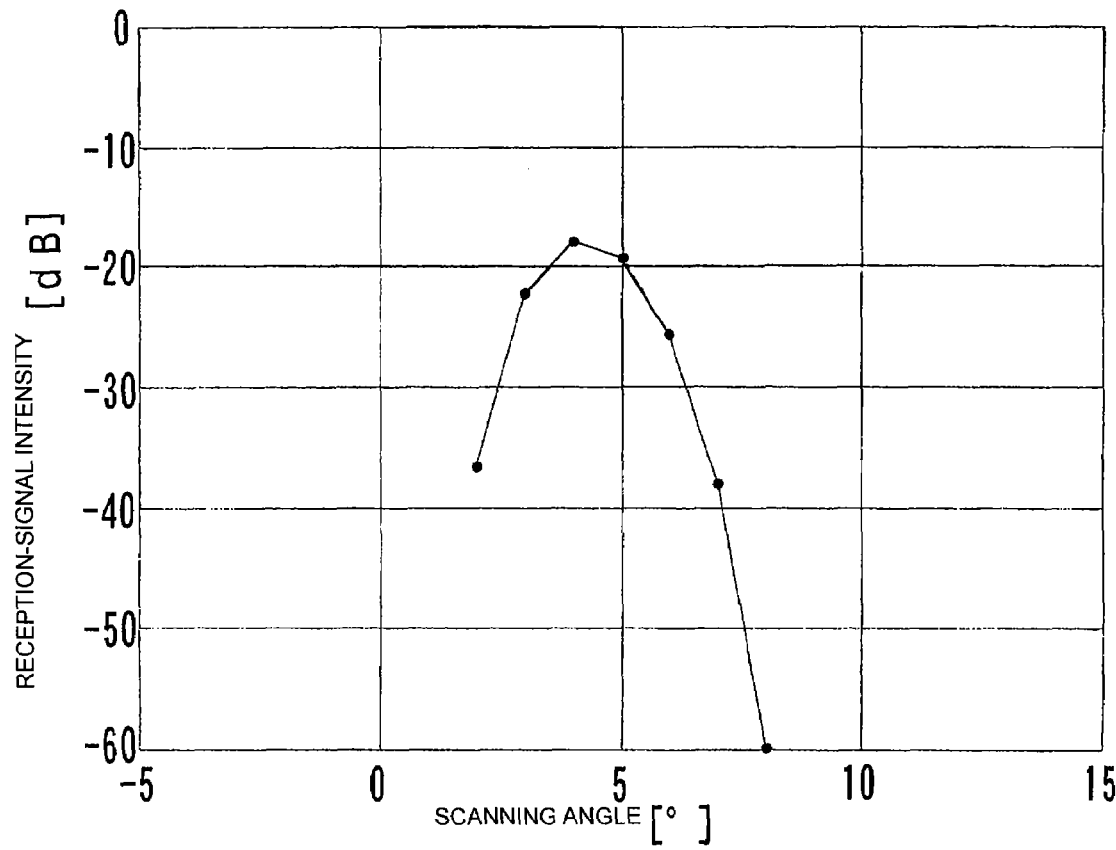
FIG. 6 shows the relationship between the azimuth angle of a transmission beam and a corresponding reception-signal intensity in a case where a target is located in a 5-degree direction.
Figure 7:
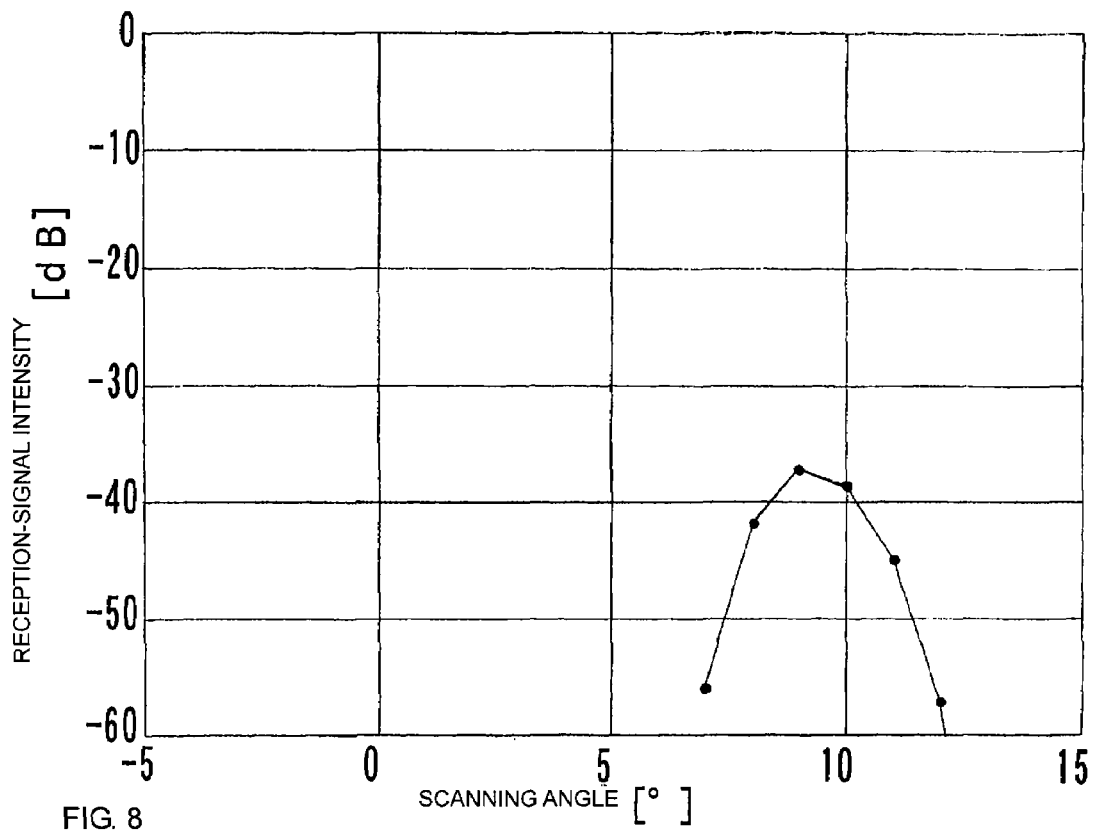
FIG. 7 shows the relationship between the azimuth angle of a transmission beam and a corresponding reception-signal intensity in a case where a target is located in a 10-degree direction.
Figure 8:
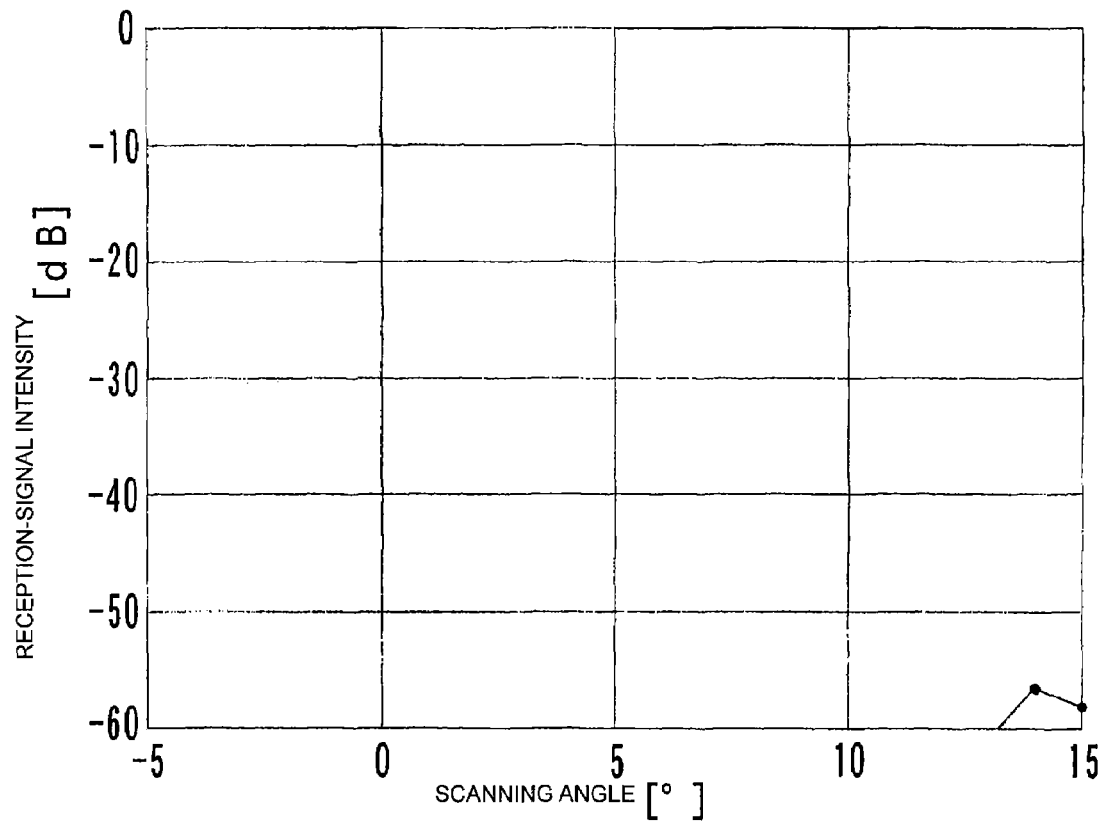
FIG. 8 shows the relationship between the azimuth angle of a transmission beam and a corresponding reception-signal intensity in a case where a target is located in a 15-degree direction.

FIGS. 5 to 8 each show the relationship between the scanning angle of a transmission beam and a corresponding reception-signal intensity in a case where a target is located in an azimuth direction. The results shown in FIGS. 5 to 8 represent cases where the pattern of a transmission beam shown in FIG. 3 is used for both transmission and reception. FIG. 5 shows a case where a target is located in the 0-degree direction (the center direction of the scanning-angle range). FIG. 6 shows a case where a target is located in the +5-degree direction. FIG. 7 shows a case where a target is located in the +10-degree direction. FIG. 8 shows a case where a target is located in the +15-degree direction.

When receiving a result of at least a single scanning operation of a transmission beam, the target detector 13 detects the scanning-angle distribution of reception-signal intensities using a reception-signal intensity detected by the peak detector 12. The azimuth angles of targets and corresponding scanning-angle distributions of reception-signal intensities are stored in association with each other, as shown in FIGS. 5 to 8, in advance in the data processing unit 10. Alternatively, the relationship between the azimuth angle of a target and a scanning angle exhibiting the maximum reception-signal intensity, as shown in FIG. 4, is stored in advance in the data processing unit 10. The target detector 13 detects a scanning-angle direction exhibiting the maximum reception-signal intensity in accordance with the scanning-angle distribution of reception-signal intensities obtained by the latest scanning operation, and reads the stored relationship (FIG. 4) between a scanning angle exhibiting the maximum reception-signal intensity and the azimuth angle of a target. Then, the target detector 13 compares the detection results with stored information. The target detector 13 detects the azimuth angle of the target in accordance with the comparison results. For example, in a case where, as shown in FIG. 7, the distribution of reception-signal intensities in which the maximum reception-signal intensity is achieved when the azimuth angle of a transmission beam is 9 degrees is obtained, the target detector 13 detects that the target is located in the 10-degree direction. In a case where, as shown in FIG. 8, the distribution of reception-signal intensities in which the maximum reception-signal intensity is achieved when the azimuth angle of a transmission beam is 14 degrees is obtained, the target detector 13 detects that the target is located in the 15-degree direction.

As described above, according to this embodiment, a target is located at an azimuth angle (scanning angle) that is away in the direction away from the center by 1 degree from a scanning angle exhibiting the maximum value in the distribution of reception-signal intensities. By using such a relationship, a target located in a position at an azimuth angle of 16 degrees, which is outside a scanning-angle range, can be detected in a case where the maximum reception-signal intensity appears at 15 degrees. Thus, a target located outside the angle range in which scanning of a transmission beam is actually performed can also be detected. That is, with the above-described configuration of this embodiment, a wide-azimuth detection area can be achieved for short distance.

In this case, the shorter the distance to an edge of the scanning-angle range is, the lower the reception-signal intensity of a transmission beam is, as described above. Thus, in an edge direction, although a target located in a long distance from the vehicle cannot be detected, a target located in a short distance from the vehicle can be detected.

In contrast, at the center of the scanning-angle range, since a reception-signal intensity that is substantially the same as in a known technology can be set, a target located in a long distance from the vehicle can be detected in a known manner.

As a result, a vehicle located in the vicinity of the center direction of the scanning-angle range and in a long distance from the vehicle in which the radar apparatus is installed can be detected accurately. In addition, in the vicinity of the vehicle in which the radar apparatus is installed, detection of a vehicle can be performed over a wide range. Thus, a vehicle that tries to suddenly cut in front of the vehicle in which the radar apparatus is installed can be detected reliably at an early stage.

The azimuth angle of a target is detected in accordance with the maximum reception-signal intensity in a scanning-angle direction in the above description. However, when the azimuth angles of targets and distribution patterns of reception-signal intensities are stored in association with each other as shown in FIGS. 5 to 8, the azimuth angle of the target can be detected by comparing the detected distribution pattern of reception-signal intensities with the stored distribution patterns of reception-signal intensities. In the method using such distribution patterns, different distribution patterns can be obtained for individual azimuth angles of targets. Thus, the azimuth angle of a target can be determined in a unique manner.

A radar apparatus according a second embodiment will be described with reference to FIGS. 9 to 15.

The radar apparatus according to this embodiment has a configuration the same as the radar apparatus described in the first embodiment. The radar apparatus according to this embodiment is different from that according to the first embodiment in a method for controlling a transmission beam and a method for detecting a peak. Thus, the description of component elements will be omitted. Only the method for controlling a transmission beam and the method for detecting a peak will be described below.

Figure 9:
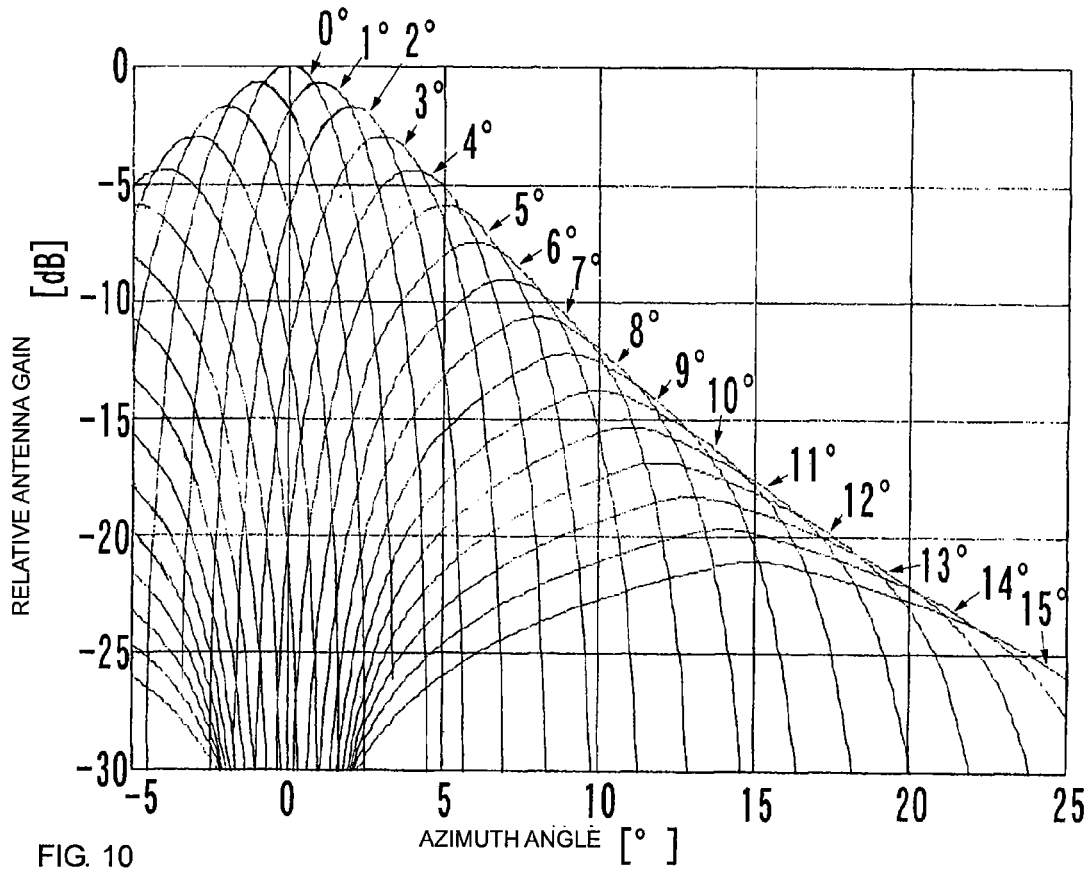
FIG. 9 is an antenna-gain pattern diagram showing the relationship between an azimuth angle and a relative antenna gain in a second embodiment.

FIG. 9 is an antenna-gain pattern diagram showing the relationship between an azimuth angle and a relative antenna gain in this embodiment. Each of an azimuth angle and a scanning angle represents an angle formed with respect to the 0-degree direction, which is the center direction of the scanning-angle range of the antenna 5. In addition, an angle on the right-hand side when viewed from the vehicle in which the radar apparatus is installed toward the radiation direction represents a plus angle. An angle on the left-hand side when viewed from the vehicle toward the radiation direction represents a minus angle. The scanning-angle resolution is 1 degree.

Concerning transmission beams, a reception intensity corresponding to a transmission beam in the center direction of the scanning-angle range is set higher than a reception intensity corresponding to a transmission beam in a different scanning-angle direction. In addition, reception-signal intensities corresponding to transmission beams are gradually reduced from the center direction toward an edge direction of the scanning-angle range. In addition, the widths of transmission beams gradually increase from the center direction toward the edge direction of the scanning-angle range.

For example, in the example shown in FIG. 9, the beam width of a transmission beam in the 0-degree direction is about 6 degrees (i.e., the width of the 0-degree transmission beam extends from −3 degrees to +3 degrees). As the scanning angle increases, the beam width increases. Thus, the beam width of a transmission beam in the +15-degree direction, which is an edge of the scanning-angle range, is 20 degrees or more. Accordingly, a transmission beam in the +15-degree direction can be reflected by a target located at an azimuth angle of +25 degrees, and a reception signal can be obtained.

Figure 10:
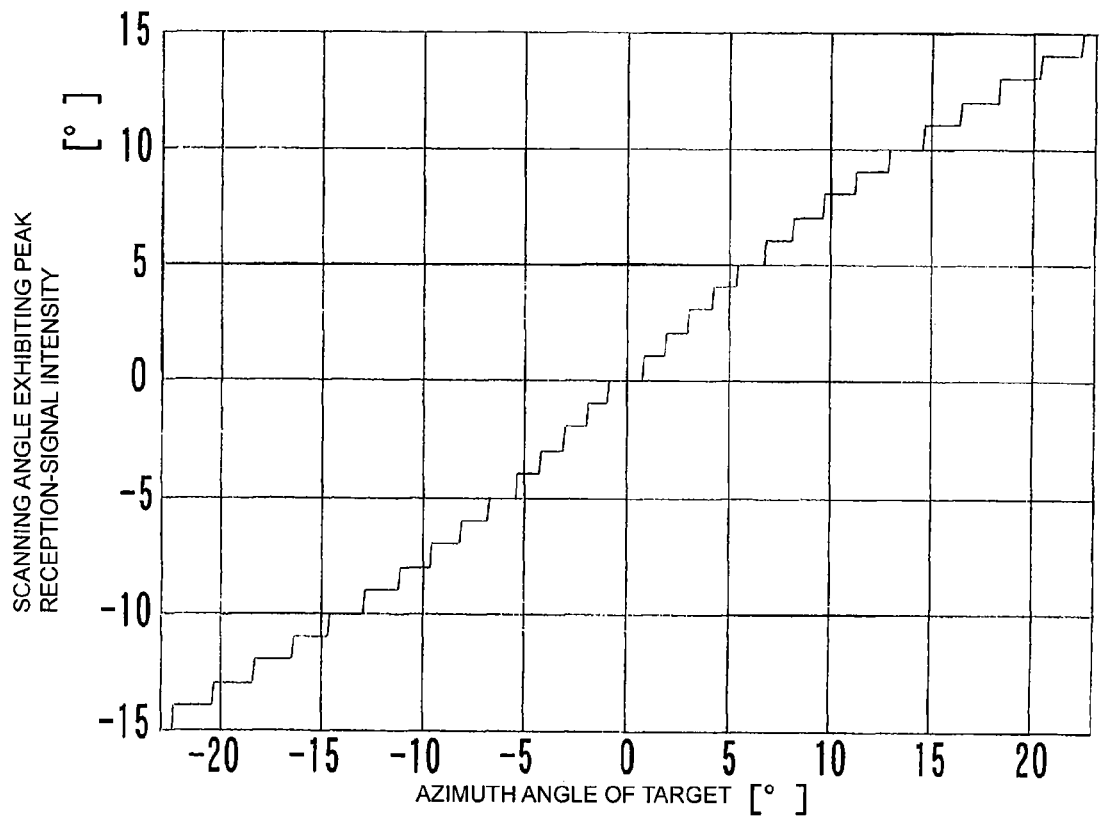
FIG. 10 shows the relationship between an azimuth angle exhibiting a peak reception-signal intensity and the azimuth angle of a target in a case where transmission beams are distributed as shown in FIG. 9.

With such a setting, the relationship between a scanning angle exhibiting a peak reception-signal intensity and the azimuth angle of a target, as shown in FIG. 10, can be obtained.

FIG. 10 shows the relationship between a scanning angle exhibiting a peak reception-signal intensity and the azimuth angle of a target in a case where a transmission beam is distributed as shown in FIG. 9.

As shown in FIG. 10, a scanning angle exhibiting a peak reception-signal intensity is shifted from substantially the azimuth angle of a target, except for the 0-degree direction, toward the center direction (0-degree direction). For example, when the azimuth angle of a target is 5 degrees, a scanning angle exhibiting a peak reception-signal intensity is 4 degrees. For example, when the azimuth angle of a target is 20 degrees, a scanning angle exhibiting a peak reception-signal intensity is 13 degrees. When a scanning angle exhibiting a peak reception-signal intensity is 15 degrees, the azimuth angle of a target is 22 degrees. Accordingly, with the use of the method for controlling a transmission beam used in this embodiment, the azimuth of a target located in a range about ±22 degrees can be detected only by performing scanning of a transmission beam over a range of ±15 degrees.

Figure 11:
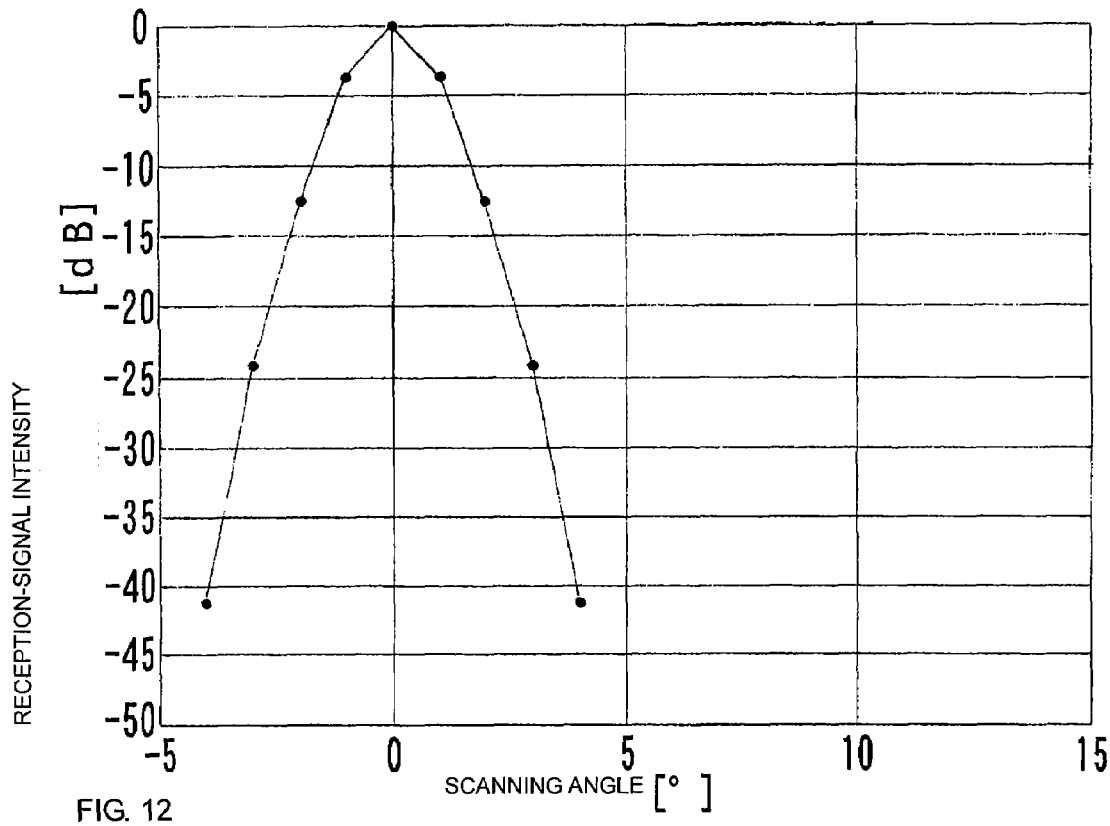
FIG. 11 shows the relationship between the azimuth angle of a transmission beam and a corresponding reception-signal intensity in a case where a target is located in a 0-degree direction.
Figure 12:
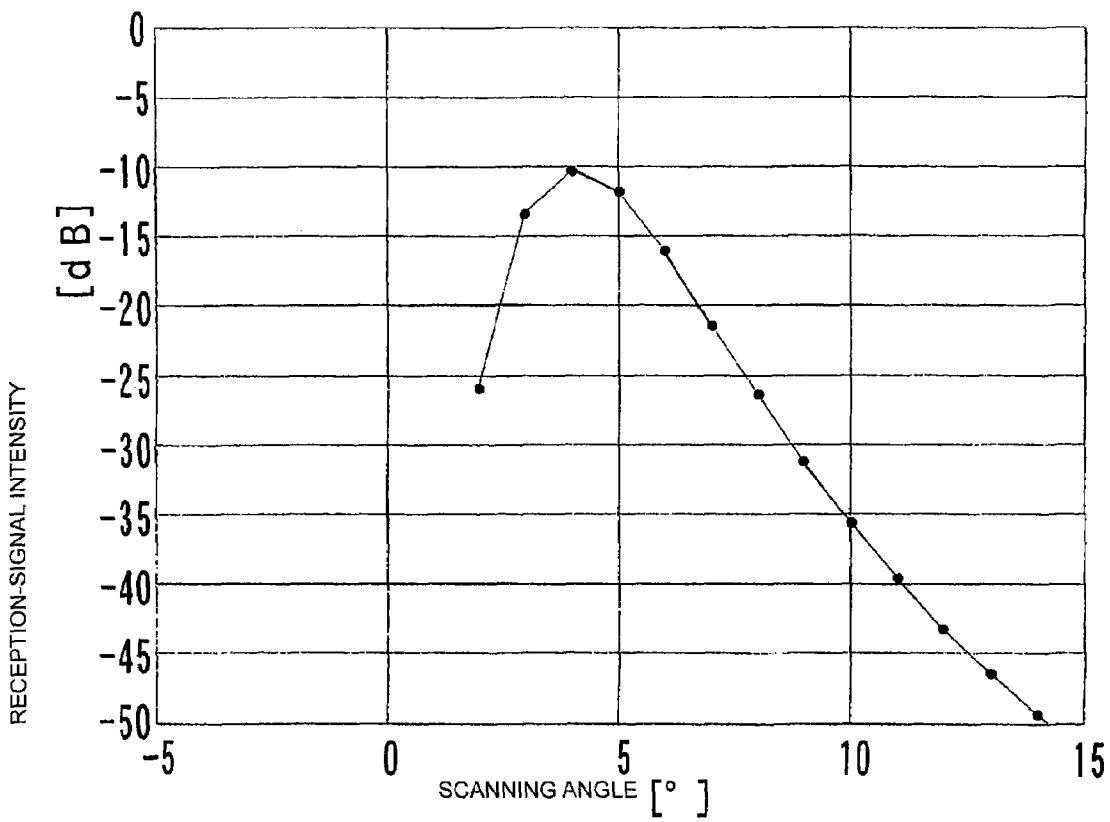
FIG. 12 shows the relationship between the azimuth angle of a transmission beam and a corresponding reception-signal intensity in a case where a target is located in a 5-degree direction.
Figure 13:
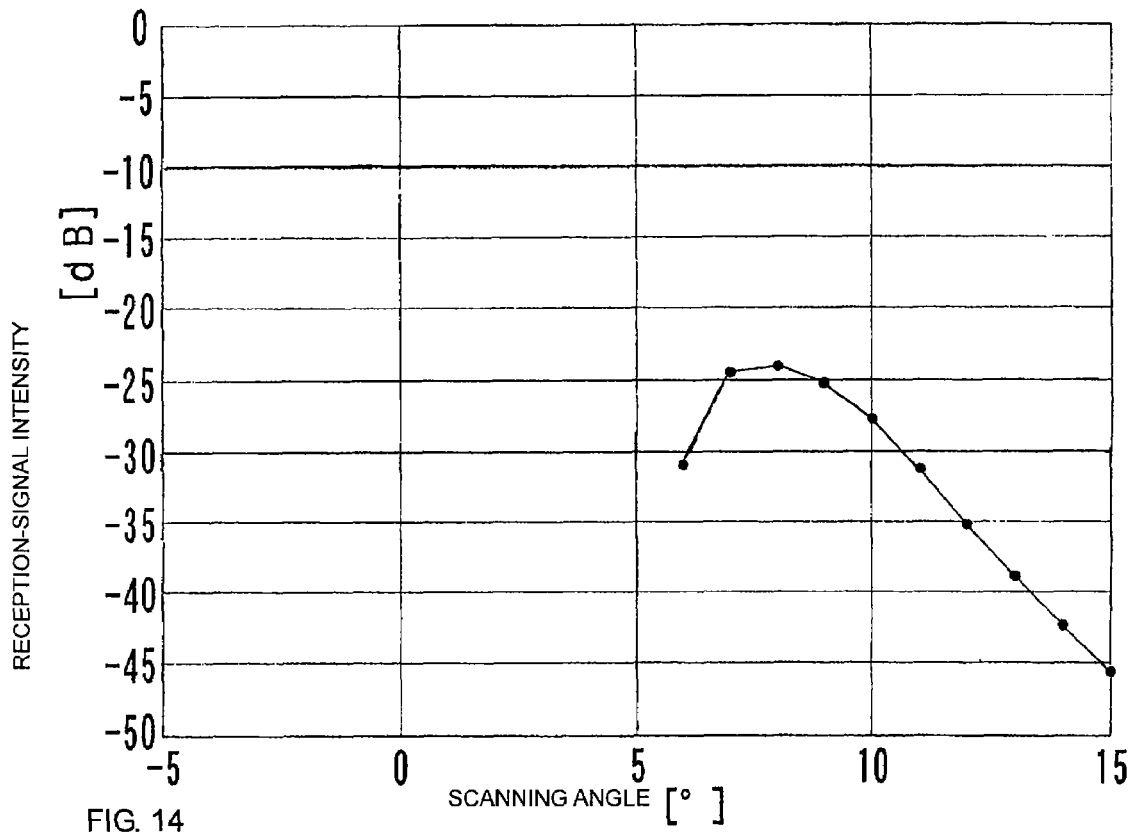
FIG. 13 shows the relationship between the azimuth angle of a transmission beam and a corresponding reception-signal intensity in a case where a target is located in a 10-degree direction.
Figure 14:
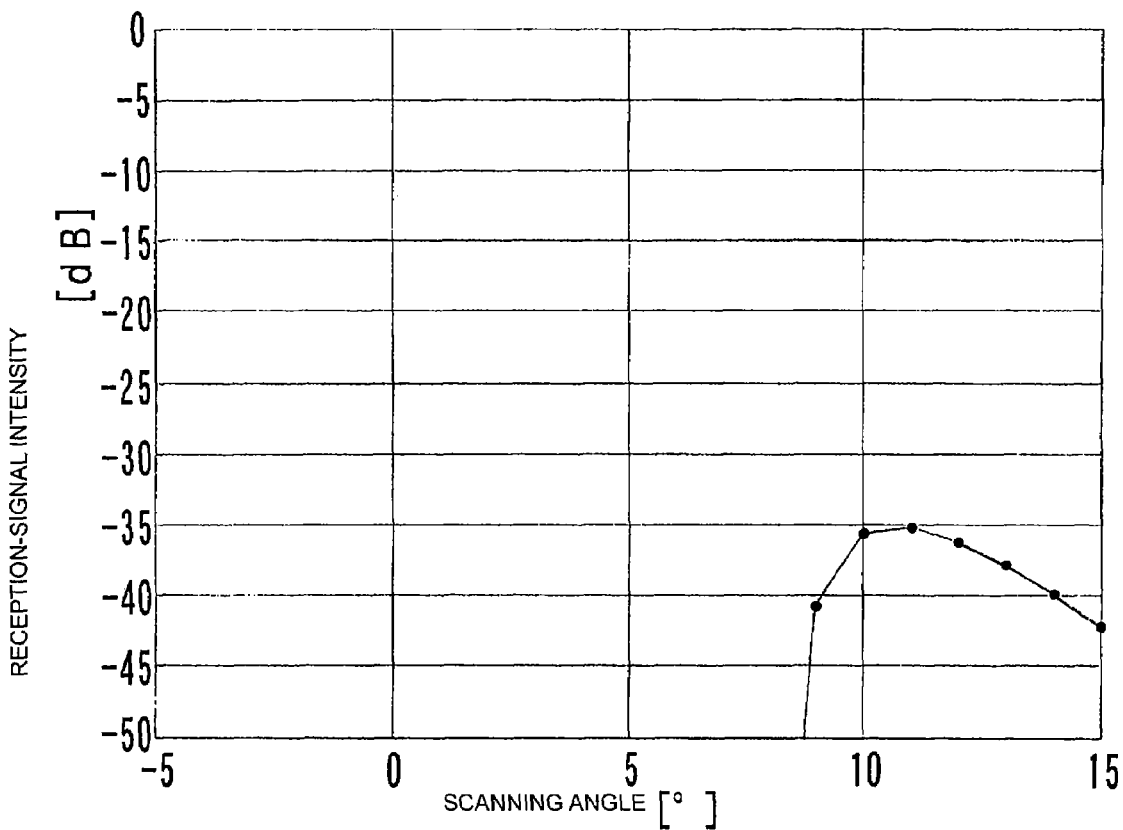
FIG. 14 shows the relationship between the azimuth angle of a transmission beam and a corresponding reception-signal intensity in a case where a target is located in a 15-degree direction.
Figure 15:
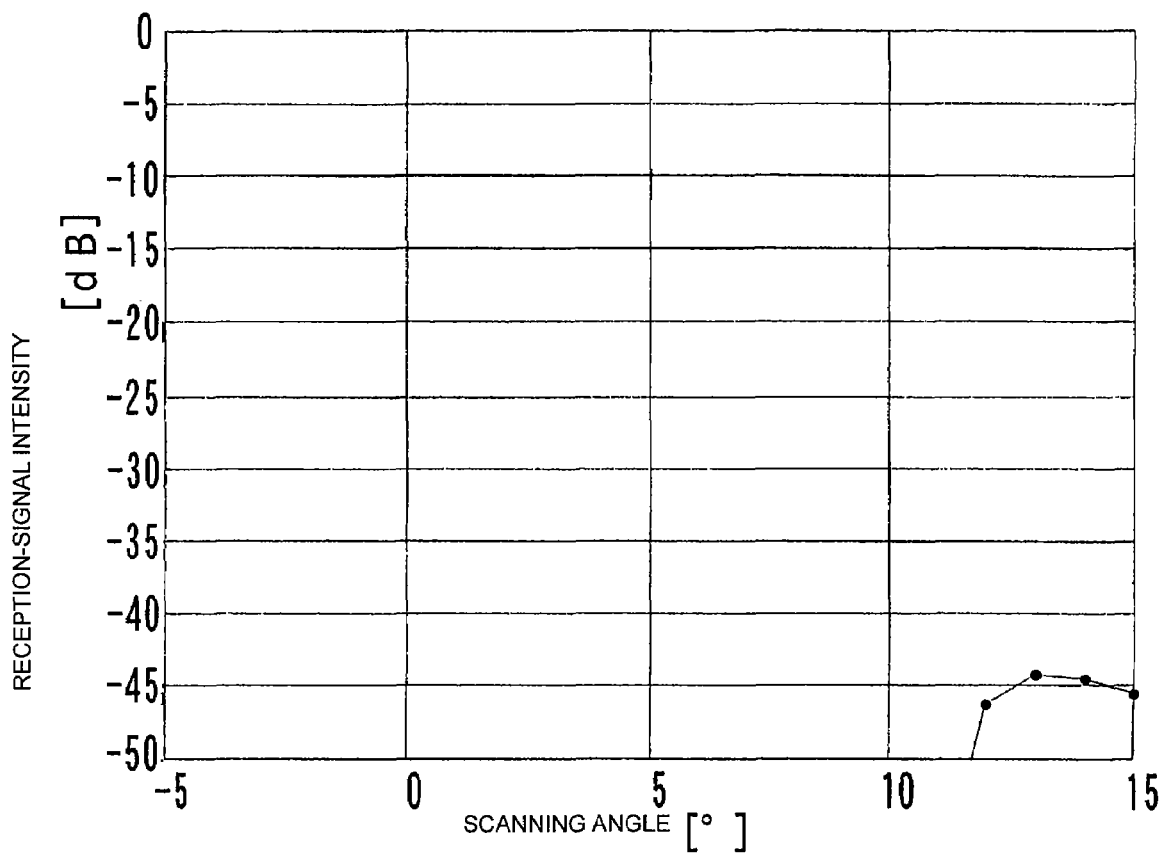
FIG. 15 shows the relationship between the azimuth angle of a transmission beam and a corresponding reception-signal intensity in case where a target is located in a 20-degree direction.

FIGS. 11 to 15 each show the relationship between the scanning angle of a transmission beam and a corresponding reception-signal intensity in a case where a target is located in an azimuth direction. The results shown in FIGS. 11 to 15 represent cases where the pattern of a transmission beam shown in FIG. 9 is used for both transmission and reception. FIG. 11 shows a case where a target is located in the 0-degree direction (the center direction of the scanning-angle range). FIG. 12 shows a case where a target is located in the +5-degree direction. FIG. 13 shows a case where a target is located in the +10-degree direction. FIG. 14 shows a case where a target is located in the +15-degree direction. FIG. 15 shows a case where a target is located in the +20-degree direction.

In the radar apparatus according to this embodiment, the azimuth angles of targets and corresponding scanning-angle distributions of reception-signal intensities are stored in association with each other, as shown in FIGS. 11 to 15, in advance in the data processing unit 10. Alternatively, the relationship between the azimuth angle of a target and a scanning angle exhibiting the maximum reception-signal intensity, as shown in FIG. 10, is stored in advance in the data processing unit 10. The target detector 13 detects a scanning-angle direction exhibiting the maximum reception-signal intensity in accordance with the scanning-angle distribution of reception-signal intensities obtained by the latest scanning operation, and reads the stored relationship (FIG. 4) between a scanning angle exhibiting the maximum reception-signal intensity and the azimuth angle of a target. Then, the target detector 13 compares the detection results with stored information. The target detector 13 detects the azimuth angle of the target in accordance with the comparison results. For example, in a case where, as shown in FIG. 13, the distribution of reception-signal intensities in which the maximum reception-signal intensity is achieved when the scanning angle of a transmission beam is 8 degrees is obtained, the target detector 13 detects that the target is located in the 10-degree direction. In a case where, as shown in FIG. 14, the distribution of reception-signal intensities in which the maximum reception-signal intensity is achieved when the scanning angle of a transmission beam is 11 degrees is obtained, the target detector 13 detects that the target is located in the 15-degree direction. In a case where, as shown in FIG. 15, the distribution of reception-signal intensities in which the maximum reception-signal intensity is achieved when the scanning angle of a transmission beam is 13 degrees is obtained, the target detector 13 detects that the target is located in the 20-degree direction.

As described above, according to this embodiment, an azimuth angle at which a target is located is more distant from the center than an azimuth angle exhibiting the maximum value in the distribution of reception-signal intensities. Thus, as shown in FIG. 15, a target located outside the angle range in which scanning of a transmission beam is actually performed can also be detected. That is, with the above-described configuration of this embodiment, a wide-azimuth detection area can be achieved for short distance. In this embodiment, the shorter the distance to an edge of the scanning-angle range is, the greater the width of a transmission beam is. Thus, a wider detection range can be achieved, as compared with the method used in the first embodiment.

In contrast, at the center of the scanning-angle range, since a transmission-beam width that is substantially the same as in a known technology and the first embodiment can be set, a target located in a long distance from the vehicle in which the radar apparatus is installed can be detected in a known manner.

As a result, a vehicle located in the vicinity of the center direction of the scanning-angle range and in a long distance from the vehicle in which the radar apparatus is installed can be detected accurately. In addition, in the vicinity of the vehicle in which the radar apparatus is installed, detection of a vehicle can be performed over a wider range. Thus, a vehicle that tries to suddenly cut in front of the vehicle in which the radar apparatus is installed can be detected reliably at an early stage.

In the above description, the azimuth angle of a target is detected in accordance with a scanning angle exhibiting the maximum reception-signal intensity. However, when the azimuth angles of targets and scanning-angle distribution patterns of reception-signal intensities are stored in association with each other as shown in FIGS. 11 to 15, the azimuth angle of the target can be detected by comparing the detected scanning-angle distribution pattern of reception-signal intensities with the stored distribution patterns of reception-signal intensities. In the method using such distribution patterns, different distribution patterns can be obtained for individual azimuth angles of targets. Thus, the azimuth angle of a target can be determined in a unique manner.

A radar apparatus according to a third embodiment will be described with reference to FIGS. 16 and 17.

Figure 16:
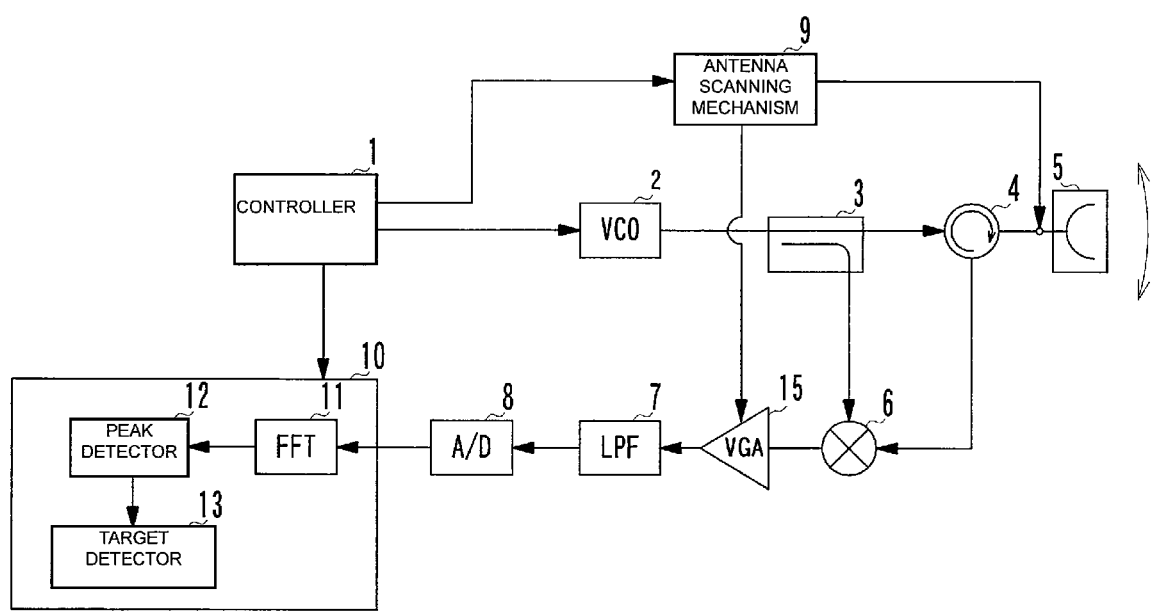
FIG. 16 is a schematic block diagram showing a radar apparatus according to a third embodiment.

FIG. 16 is a schematic block diagram showing a radar apparatus according to this embodiment. The radar apparatus according to this embodiment is obtained by adding a VGA (Variable Gain Amplifier) 15 between the mixer 6 and the LPF 7 of the radar apparatus shown in FIG. 1 according to the first embodiment. The configuration of the other portions of the radar apparatus according to this embodiment is the same as that of the radar apparatus according to the first embodiment.

The VGA 15 is an amplifier that is capable of controlling a gain. Information on the scanning angle of a transmission beam is supplied from the antenna scanning mechanism 9 to the VGA 15, and the VGA 15 changes, in accordance with the information on the scanning angle, the amplification factor of an IF beat signal output from the mixer 6. Thus, control of a relative antenna gain for an azimuth angle as shown in FIG. 3 can be achieved without controlling the intensity of a transmission beam. As in the first embodiment, the IF beat signal whose gain has been adjusted as described above passes through the LPF 7 and is digital-converted by the A/D converter 8. Then, the digital-converted data is supplied to the data processing unit 10. The data processing unit 10 detects a target by processing the received data, as described in the first embodiment.

With this configuration, a vehicle located in the vicinity of the center direction of a scanning-angle range and in a long distance from a vehicle in which the radar apparatus is installed can be detected accurately, and in the vicinity of the vehicle in which the radar apparatus is installed, detection of a vehicle can be performed over a wide range, without controlling the intensity of a transmission beam in accordance with a scanning angle.

The configuration in which the VGA 15 is provided between the mixer 6 and LPF 7 is shown in FIG. 16. However, as shown in FIG. 17, instead of using the VGA 15, a level corrector 14 may be provided between the FFT processor 11 and the peak detector 12 of the data processing unit 10.

Figure 17:
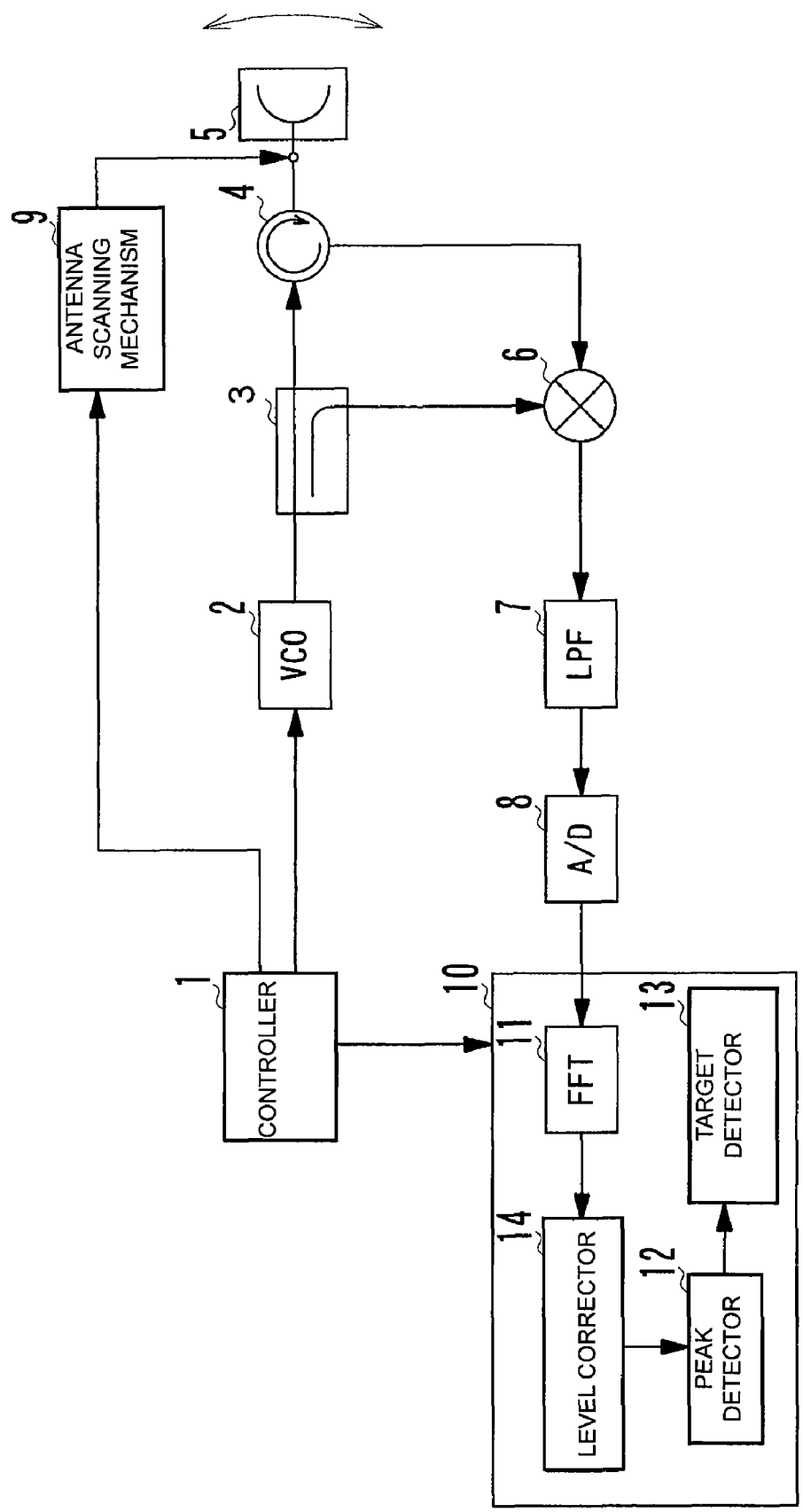
FIG. 17 is a schematic block diagram showing another configuration of the radar apparatus according to the third embodiment.

FIG. 17 is a schematic block diagram showing another configuration of the radar apparatus according to this embodiment.

With this configuration, an IF beat signal corresponding to a transmission beam that has not been subjected to intensity control based on a scanning-angle direction is obtained and FFT processing is performed. The level corrector 14 corrects, in accordance with information on the scanning angle of a transmission beam input from the controller 1, the level of the FFT-processed data. Thus, control of a relative antenna gain for an azimuth angle as shown in FIG. 3 can be achieved without controlling the intensity of a transmission beam.

As described above, irrespective of control of the intensity of a transmission beam in accordance with a scanning angle, the intensity of a reception signal or reception data is adjusted and corrected using each circuit element of a reception system. Thus, a vehicle located in the vicinity of the center direction of a scanning-angle range and in a long distance from a vehicle in which the radar apparatus is installed can be detected accurately. In addition, in the vicinity of the vehicle in which the radar apparatus is installed, detection of a vehicle can be performed over a wide range.

A case where control of the intensity of a transmission beam in accordance with a scanning angle is not performed has been described in this embodiment. However, adjustment and correction of a reception signal and reception data may be performed after the scanning-angle control of the intensity of a transmission beam is performed.

An example in which an azimuth angle exhibiting the maximum reception intensity is disposed at the center of the scanning-angle range has been described in each of the above-described embodiments. However, in accordance with the position in which the radar apparatus is installed and the number of radar apparatuses installed, setting may be performed such that the maximum reception-signal intensity appears at an azimuth angle other than the center of the scanning-angle range. For example, in a case where a radar is installed on either side in front of a vehicle, the radar on the left side is set such that the maximum reception-signal intensity appears at an azimuth angle nearer a right edge than the center of the scanning-angle range, and the radar on the right side is set such that the maximum reception-signal intensity appears at an azimuth angle nearer a left edge than the center of the scanning-angle range.

Furthermore, in the method described in the third embodiment, the level corrector 14 is capable of correcting the distribution of reception-signal intensities of the radar, and the correction can be performed in a different way according to the condition. Thus, for example, a range in which detection of a target can be performed can be changed when necessary by changing the point exhibiting the maximum reception intensity in the scanning-angle range in accordance with the angle of the steering wheel of the vehicle.

In addition, although a scanning angle exhibiting a peak is detected in accordance with observed values of discrete reception-signal intensities based on a scanning-angle pitch in each of the above-described embodiments, a scanning angle exhibiting a peak may be detected by performing interpolation of the obtained distribution of reception-signal intensities.

Figure 18:
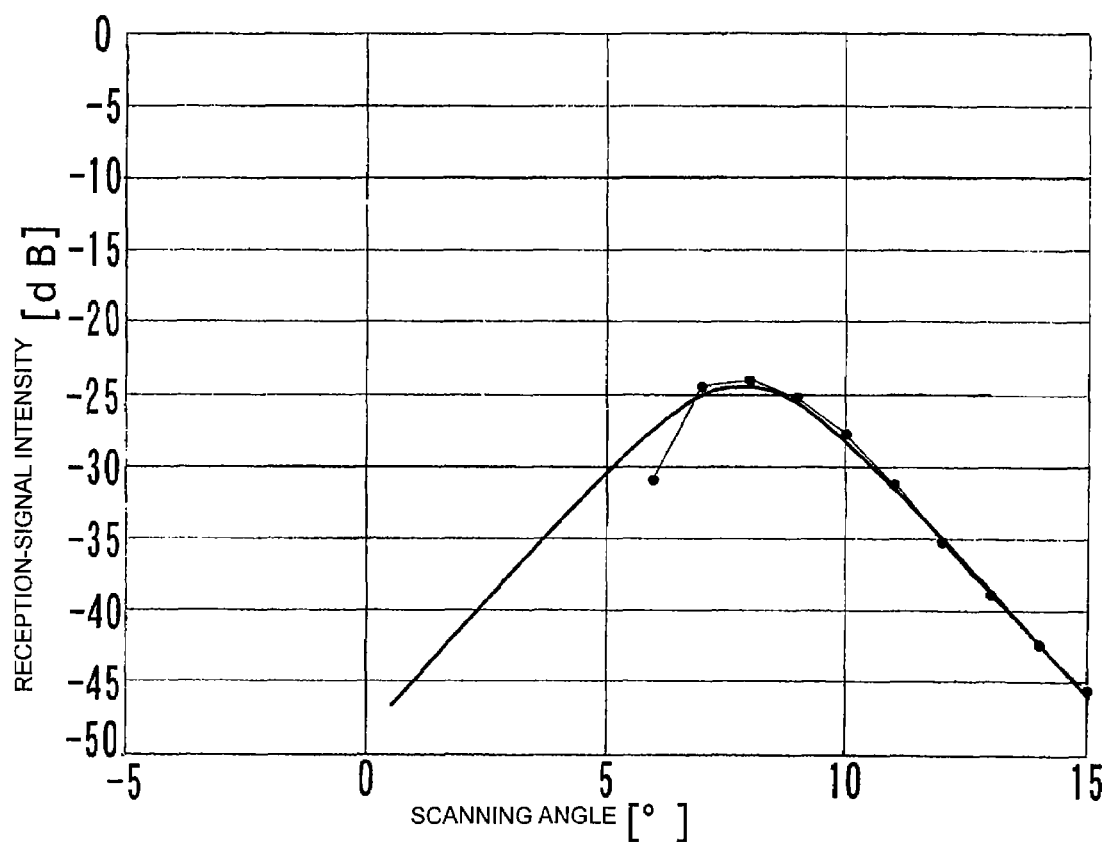
FIG. 18 is a schematic diagram showing a case where a reception-signal intensity is interpolated using approximation by a quadratic function.

For example, FIG. 18 is a schematic diagram showing a case where a reception-signal intensity is interpolated using approximation by a quadratic function. In this case, a scanning angle exhibiting a peak is detected in accordance with a curve representing a reception-signal intensity expressed by an approximate expression. As a peak scanning-angle to be detected, a scanning angle that is the closest to an angle exhibiting a peak obtained from the curve expressed by the approximate expression is adopted. The azimuth angle of a target is detected using the detected scanning angle in accordance with the method described in the first embodiment. With the use of such a method, a variation in the reception-signal intensity between scanning angles can be corrected, and the scanning angle exhibiting the peak can be detected more accurately. As an interpolation method, in addition to the above-described approximation by a quadratic function, approximation by a different function, smoothing (moving average), or a method for obtaining reception-signal intensities and a plurality of points for corresponding scanning angles and calculating the center of mass may be used.

The invention claimed is:

1. A radar apparatus comprising:
    an antenna;
    a transmission-beam forming unit that forms a transmission beam to be transmitted from the antenna;
    a beam scanner that scans the transmission beam within a predetermined scanning-angle range; and
    a target detecting unit that detects a target based on a reception signal obtained when the transmission beam is reflected by the target and received by the antenna,
    wherein, when the target is located at an azimuth angle of X degrees toward at least one edge of the scanning-angle range from a predetermined azimuth angle in the scanning-angle range, the target detecting unit detects the target based on a reception-signal intensity for a transmission beam transmitted at the azimuth angle of X degrees that is lower than a reception-signal intensity for at least one transmission beam at an azimuth angle that is closer to the predetermined azimuth angle in the scanning-angle range than the azimuth angle of X degrees.

2. The radar apparatus according to claim 1, wherein the target detecting unit detects the target based on the reception-signal intensity for the transmission beam transmitted at the azimuth angle of X degrees that is lower than a reception-signal intensity for a transmission beam that is adjacent to the transmission beam transmitted at the azimuth angle of X degrees and that is at an azimuth angle closer to the predetermined azimuth angle in the scanning range than the azimuth angle of X degrees.

3. The radar apparatus according to claim 1, wherein the transmission-beam forming unit sets, relative to an antenna gain in the predetermined direction in the scanning-angle range, antenna gains in scanning-angle directions that are gradually reduced toward the one edge of the scanning-angle range.

4. The radar apparatus according to claim 1, wherein the transmission-beam forming unit gradually increases widths of transmission beams in scanning-angle directions from the predetermined direction in the scanning-angle range toward the one edge of the scanning-angle range.

5. The radar apparatus according to claim 1, wherein the target detecting unit corrects reception-signal intensities in scanning-angle directions such that, relative to a reception-signal intensity in the predetermined direction in the scanning-angle range, the reception-signal intensities are gradually reduced toward the one edge of the scanning-angle range.

6. The radar apparatus according to claim 1, further comprising a storage portion that stores a correspondence table or a relational expression between an azimuth angle of the target and a corresponding reception-signal intensity,
    wherein the target detecting unit detects the azimuth angle of the target by detecting a scanning angle exhibiting a maximum reception-signal intensity and applying the detected scanning angle to the correspondence table or the relational expression.

7. The radar apparatus according to claim 1, wherein the target detecting unit performs interpolation of reception-signal intensities corresponding to transmission beams and detects a maximum reception-signal intensity.

8. The radar apparatus according to claim 1, wherein the target detecting unit adjusts and corrects an intensity of the reception signal.

9. The radar apparatus according to claim 8, wherein the target detecting unit detects the target without controlling an intensity of the transmission beam.

* * * * *